(12) United States Patent
Thubert et al.

(10) Patent No.: US 9,602,420 B2
(45) Date of Patent: Mar. 21, 2017

(54) SCHEDULE-BASED PRIORITIZATION IN CONTENTION-BASED SHARED-MEDIA COMPUTER NETWORKS

(71) Applicant: Cisco Technology, Inc., San Jose, CA (US)

(72) Inventors: Pascal Thubert, La Colle sur Loup (FR); Patrick Wetterwald, Mouans Sartoux (FR); Paul Didier, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 382 days.

(21) Appl. No.: 13/796,176

(22) Filed: Mar. 12, 2013

(65) Prior Publication Data
US 2014/0269759 A1    Sep. 18, 2014

(51) Int. Cl.
*H04L 12/807* (2013.01)
*H04L 12/833* (2013.01)
*H04L 12/841* (2013.01)

(52) U.S. Cl.
CPC .......... *H04L 47/27* (2013.01); *H04L 47/2458* (2013.01); *H04L 47/28* (2013.01)

(58) Field of Classification Search
None
See application file for complete search history.

(56) References Cited

U.S. PATENT DOCUMENTS

| | | | |
|---|---|---|---|
| 6,188,698 B1 | 2/2001 | Galand et al. | |
| 6,320,845 B1 | 11/2001 | Davie | |
| 6,621,791 B1 | 9/2003 | Davie | |
| 6,674,721 B1 | 1/2004 | Dittia et al. | |
| 6,754,214 B1 * | 6/2004 | Mahalingaiah | H04L 45/04 370/392 |
| 7,457,973 B2 * | 11/2008 | Liu | H04W 52/0216 370/229 |
| 8,391,255 B2 | 3/2013 | Ribiere et al. | |
| 2002/0159397 A1 * | 10/2002 | Perkinson | H04L 47/10 370/256 |
| 2003/0198220 A1 | 10/2003 | Gross et al. | |
| 2006/0268701 A1 * | 11/2006 | Clark | H04L 12/5693 370/230 |
| 2007/0140129 A1 * | 6/2007 | Bauer | H04L 45/124 370/238 |
| 2008/0043688 A1 * | 2/2008 | Igarashi | H04L 12/2602 370/338 |
| 2008/0159337 A1 * | 7/2008 | Lee | H04L 1/1812 370/498 |
| 2013/0083658 A1 | 4/2013 | Vasseur et al. | |

FOREIGN PATENT DOCUMENTS

| | | |
|---|---|---|
| EP | 1940089 A1 | 7/2008 |
| WO | 2006/069219 A2 | 6/2006 |

OTHER PUBLICATIONS

Winter; et al., "RPL: IPV6 Routing Protocol for Low-Power and Lossy Networks", Internet Engineering Task Force, Request for Comments 6550, Mar. 2012, 157 pages.
Wang et al., "Integrating the fixed priority scheduling and the total bandwidth server for aperiodic tasks", Proceedings international conference on real-time computingsystems and applications, 12/12/200, pp. 215-222.
International Search Report and Written Opinion for PCT/US2014/020262 mailed Jun. 23, 2014.
Amante, et al., "IPv6 Flow Label Specification", Request for Comments 6437, Nov. 2011, 15 pages, Internet Engineering Task Force.
Wei, et al., "Industrial Deterministic Routing Extension for Low-Power and Lossy Networks", Internet Draft, draft-wei-roll-scheduling-routing-01.txt, Oct. 2012, 22 pages, Internet Engineering Task Force.

* cited by examiner

*Primary Examiner* — Huy D Vu
*Assistant Examiner* — Bao G Nguyen
(74) *Attorney, Agent, or Firm* — Parker Ibrahim & Berg LLC; James M. Behmke; Stephen D. LeBarron

(57) ABSTRACT

In one embodiment, an intermediate node in a contention-based shared-media computer network determines a scheduled window within which a packet (with an assigned priority) should be transmitted by the intermediate node. In particular, the intermediate node may specifically determine whether an actual transmission time is prior to, during, or after the window, and sets a priority of the packet as either i) a reduced priority when the actual transmission time is prior to the window, ii) the assigned priority when the actual transmission time is during the window, or iii) an augmented priority when the actual transmission time is after the window. As such, the intermediate node may then transmit the packet from the intermediate node with the set priority at the actual transmission time.

19 Claims, 5 Drawing Sheets

SCHEDULE-BASED PRIORITIZATION IN CONTENTION-BASED SHARED-MEDIA COMPUTER NETWORKS

TECHNICAL FIELD

The present disclosure relates generally to computer networks, and, more particularly, to packet transmissions in contention-based shared-media computer networks.

BACKGROUND

Mesh networks, such as Low power and Lossy Networks (LLNs) for sensor networks, have a myriad of applications, such as Smart Grid and Smart Cities. Mesh networks generally share the characteristic of being a shared-media communication networks, such as wireless networks or power-line communication (PLC) networks (a type of communication over power-lines). Various challenges are presented with mesh networks, particularly LLNs, such as lossy links, low bandwidth, battery operation, low memory and/or processing capability, etc. Specifically, in a mesh network, outgoing packets (packets going toward a root node to reach outside of the mesh) tend to collide when they approach the root of the network due to the "fan in" nature of many mesh network topologies.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
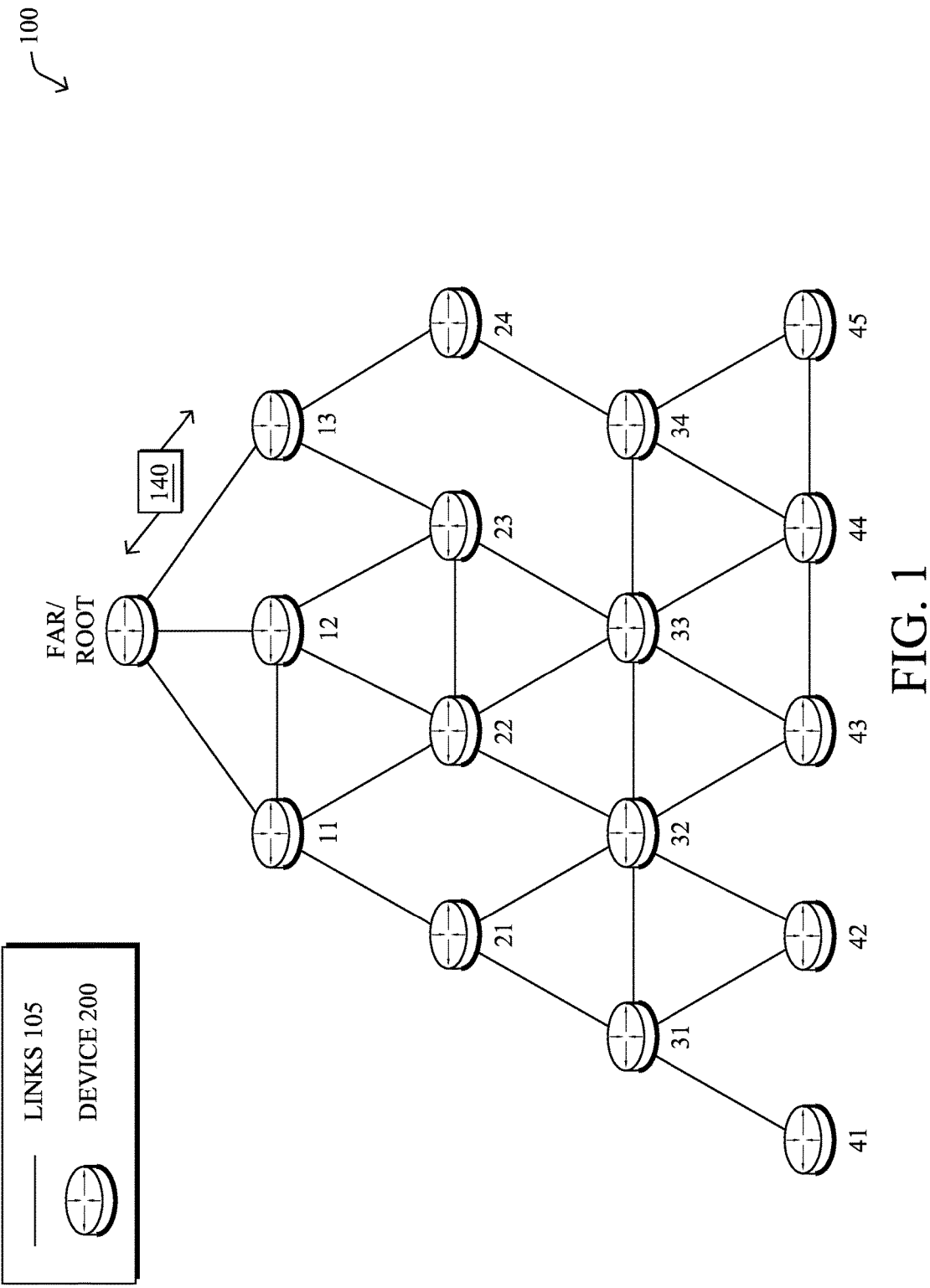
FIG. 1 illustrates an example communication network.

According to one or more embodiments of the disclosure, an intermediate node in a contention-based shared-media computer network determines a scheduled window within which a packet (with an assigned priority) should be transmitted by the intermediate node. In particular, the intermediate node may specifically determine whether an actual transmission time is prior to, during, or after the window, and sets a priority of the packet as either i) a reduced priority when the actual transmission time is prior to the window, ii) the assigned priority when the actual transmission time is during the window, or iii) an augmented priority when the actual transmission time is after the window. As such, the intermediate node may then transmit the packet from the intermediate node with the set priority at the actual transmission time.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared-media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
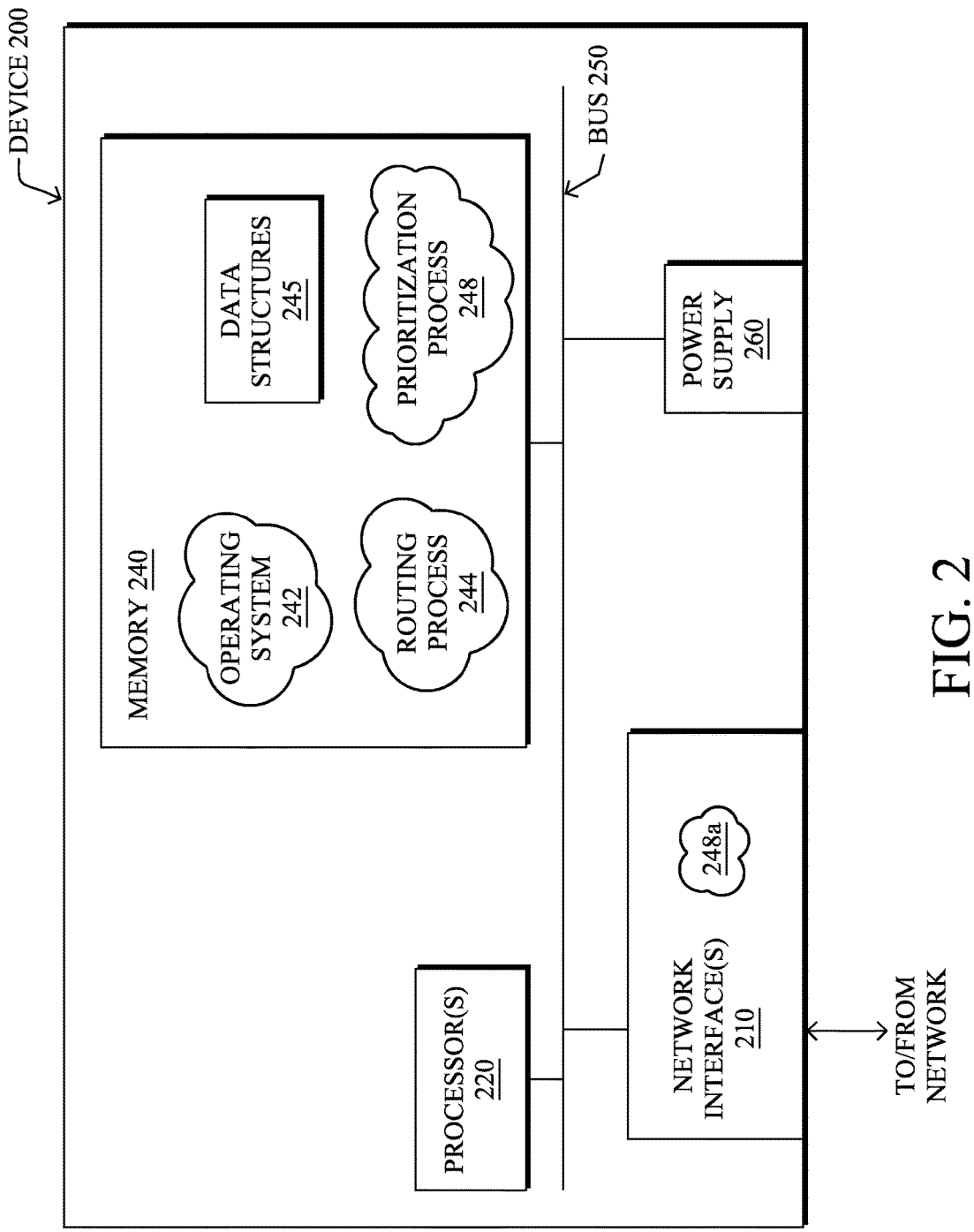
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "prioritization" process 248, as described herein. Note that while prioritization process 248 is shown in centralized memory 240, alternative embodiments provide for the process to be specifically operated within the network interfaces 210, such as a component of a MAC layer or other communication/transmission process (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P"

traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
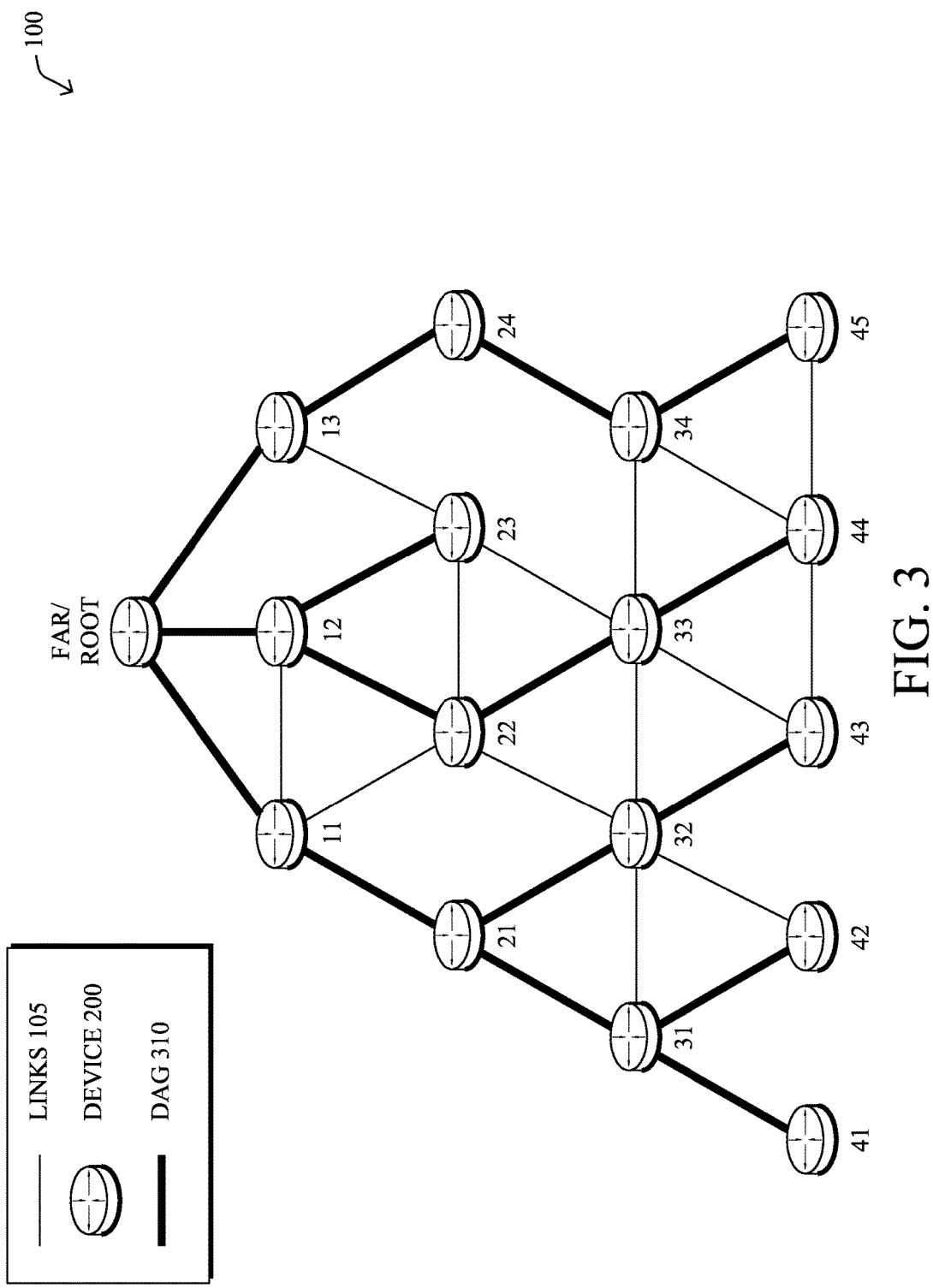
FIG. 3 illustrates an example directed acyclic graph (DAG) in the communication network in FIG. 1.

FIG. 3 illustrates an example simplified DAG 310 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

As further noted above, in mesh networks, outgoing packets (packets going toward a root node to reach outside of the mesh) tend to collide when they approach the root of the network due to the "fan in" nature of many mesh network topologies. Collision Avoidance (e.g., carrier-sense media access/collision avoidance, "CSMA/CA") generates exponentially incremented back-off times with the effect of reducing the available bandwidth on the last hop to the root, which is also the first hop from the root. This effect is highly undesirable since it reduces the throughput on the link to the root that practically determines the throughput of the whole mesh. It is thus critical to control the collisions on that link and maintain the silence times to a minimum.

Collisions are traditionally avoided in data networks with polling (e.g., using synchronous data link control, "SDLC") or checking (e.g., using request-to-send/clear-to-send, "RTS/CTS") but none of these methods are practical in most multi-hop mesh networks since it would consume the bandwidth that it supposed to protect.

In industrial applications, collision avoidance is attempted with a mix of call admission control (CAC) and Time Division Multiplexing (TDM). For instance, in such systems, the bandwidth is slotted and a time slot is reserved for communication between a particular pair of nodes. A centralized path computation engine (PCE) computes an optimized sequence of slots for each admitted flow (e.g., "contracts" in ISA100.11a, as will be understood in the art). Unfortunately, the computation is NP complete and thus the solution does not scale well. Notably, without retries and without external interference, then the method would work well. However, as soon as a packet is retried, it misses its sequence of slots (its "train") and ends up being transmitted along with other "best effort" packets. Accordingly, after that, there is no longer any guarantee in jitter or latency. As such, even with that super heavy model, 70 to 80 percent of the packets may be delivered off schedule. Another issue with this method is that the TDM slots act as a reservation, where once a packet misses its train, the whole sequence of slots is wasted all the way through.

Schedule-Based Prioritization

The techniques herein illustratively increment or decrement the priority of a packet (e.g., an outgoing or "upward" packet in a LLN mesh) based on its expected schedule, which can be carried in-band or installed in the intermediate nodes, in order to maintain the packet within schedule as it traverses the mesh, so as to avoid contention when the packet reaches the root. In one embodiments, the schedule is centrally computed (e.g., by a PCE), and the packet is possibly emitted before its scheduled time at a lower priority in order to benefit from possible silence to arrive early.

Specifically, according to one or more embodiments of the disclosure as described in detail below, an intermediate node in a contention-based shared-media computer network determines a scheduled window within which a packet (with an assigned priority) should be transmitted by the intermediate node. In particular, the intermediate node may specifically determine whether an actual transmission time is prior to, during, or after the window, and sets a priority of the packet as either i) a reduced priority when the actual transmission time is prior to the window, ii) the assigned priority when the actual transmission time is during the window, or iii) an augmented priority when the actual transmission time is after the window. As such, the intermediate node may then transmit the packet from the intermediate node with the set priority at the actual transmission time.

Illustratively, the techniques described herein may be performed by hardware, software, and/or firmware, such as in accordance with the "prioritization" process 248/248*a*, which may contain computer executable instructions executed by the processor 220 (or independent processor of interfaces 210) to perform functions relating to the techniques described herein. For example, the techniques herein may be treated as extensions to conventional transmission protocols, such as the various shared-media communication protocols, and as such, may be processed by similar components understood in the art that execute those protocols, accordingly. In particular, the techniques herein relate to time division multiplexing (TDM) protocols (e.g., ISA100.11a, TSMP, WiHART) and contention based solutions (e.g., IEEE 802.11 or 802.15.4), and is generally based on call admission control (CAC). In addition, a common sense of time is also generally necessary for scheduling, such as within various known protocols (e.g., TSMP, WiHART, and ISA100.11a) through network synchronization.

Operationally, the techniques herein begin by scheduling flows or communication "windows", which may be computed centrally and distributed to the intermediate nodes within the network. Unlike the conventional flow scheduling, where every hop has a TDM-based scheduled slot, the techniques herein use contention all the way through the network though adapting the priority of the packet to maintain packets within their assigned schedule. That is, as described herein, packets may be issued ahead of schedule with low priority, and may be forwarded at a priority that augments as the packet becomes delayed compared to its schedule. For example, the priority for the packet may be set in response to the packet traveling upward in a shared-media computer network toward a root node of that shared-media computer network.

Figure 4:
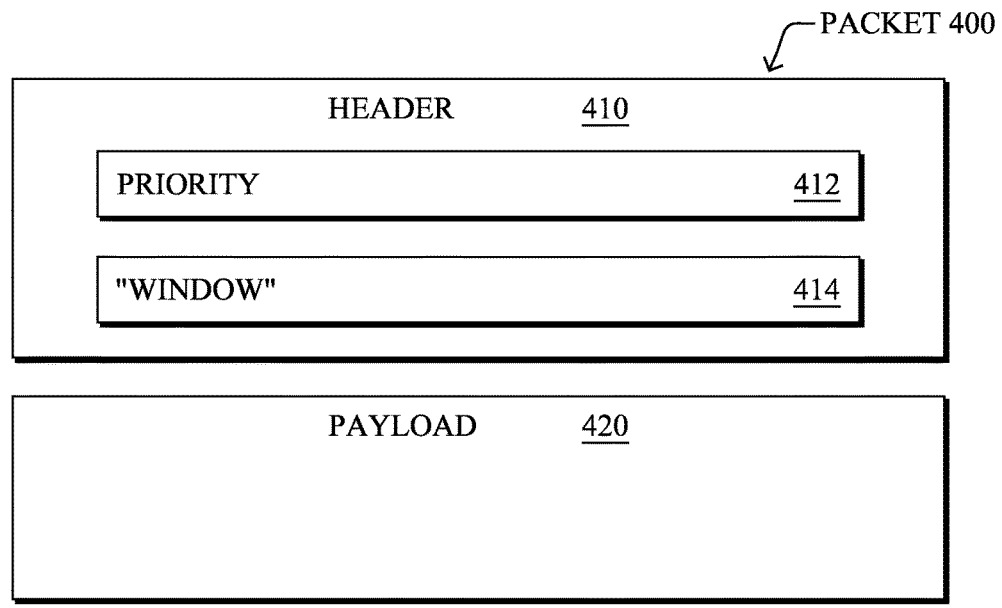
FIG. 4 illustrates an example packet format.

FIG. 4 illustrates an example simplified packet 400 (e.g., detailing packet 140 above), where the packet 400 comprises a header 410 and payload 420, as will be understood in the art. Within the header 410 are one or more fields used to direct the packet through the network, such as a source address and destination address, as well as other useful fields, such as a priority field 412 (e.g., a scale of highest to lowest priorities, such as 0-7, respectively), and optionally a designated window field 414 used to carry the an indication of the prescribed schedule for the packet.

Figure 5:
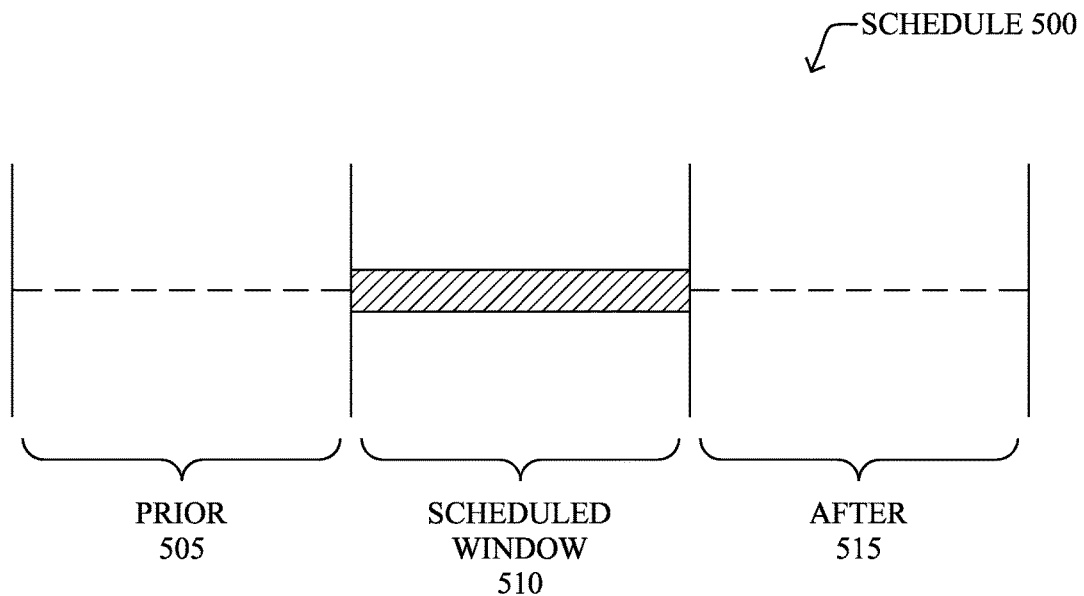
FIG. 5 illustrates an example transmission schedule.

Also, FIG. 5 illustrates a simplified concept of an example transmission schedule 500, where there is a scheduled window 510, and thus time periods that are "prior" to window 510 (before schedule) and "after" window 510, designated as 505 and 515, respectively.

The computed schedule for a packet may generally account for a number of hops and the expected number of retransmissions (ETX) at each hop with short wait intervals since no to little contentions can be expected. (Note that there are always collisions because a band, mostly an open band, can never be fully controlled, and there will always be uncontrolled signals from such devices as portable phones or other wireless devices.) Said differently, the scheduled window of a packet represents complete transmission of the packet from a source node to a destination node within the computer network. For instance, if T is the transmission time (or retransmission time) for a packet, including wait time and receipt of an acknowledgment (ACK), then the window of time for the packet within the schedule window that is between scheduled time S, and S+T*ETX.

Note that a packet for a previous schedule that is reaching the root may not interfere with a packet that is emitted at the edge of a large network. Also, a "lucky" packet (few retries) reaches the root significantly before its schedule. The techniques herein address that effect by allowing sending of a packet some time E before schedule. But then that packet is tagged with a lower priority than normal until its time comes, so in case of contention it is the one that waits.

In a same fashion an "unlucky" packet (many retries) may still be trying to reach the root after its scheduled window. In order to address contention with a packet that is within its own schedule, the delayed packet is tagged with a higher priority than normal. That is, the priority of the packet is set as a further augmented (higher) priority when the actual transmission time is further after the window.

In a simple stateless version of the techniques herein, the end-to-end schedule window is tagged/carried in the packet (field 414) and the priority of the packet (412) is reduced until that the window is entered and augmented after the window is passed.

A more refined stateless approach allows one or more intermediate nodes along the path of the packet to compute a tighter local schedule window for the packet. In this case, as opposed to considering the whole window of time a packet should spend in the mesh, the computation includes the position of this node along the path to compute a more precise window the packet is expected in the particular intermediate node that makes the computation. This instance of the techniques herein requires that the ETX used to compute the schedule and the number of hops executed (and depending on the routing info available the number of hops left to be executed) are also tagged in the packet (e.g., within the window field 414). If the time synchronization is not adequate, it is possible to measure and aggregate the time spent by the packet in the intermediate nodes until this point, by requiring the receive and transmit hardware to tag the packet appropriately between the very receive and the very transmission times (note that tagging transmit time currently exists and is used for synchronization, while the techniques herein perform tagging on the receive side and computation of the time spent in a node at transmit time).

According to another embodiment of the techniques herein, in a stateful version, states are distributed in each node along the path for each flow, similar to "contracts" in ISA100.11a. In this instance, the scheduler can indicate the precise window of time where the packet is expected at each node, so the node can apply the priority increment or decrement. Said differently, the scheduled window may be based on an expected window specific to each intermediate node along a path of the packet, where each expected window is computed centrally and distributed to each intermediate node.

Notably, when adding packet flows to the schedule, if packets generally tend to arrive earlier than expected, the scheduler can conclude that its estimation of ETX can be reduced. In a similar fashion, packets arriving late are an indication of a too small of an ETX. Accordingly, when the ETX is changed, the root may redistribute schedules.

Figure 6:
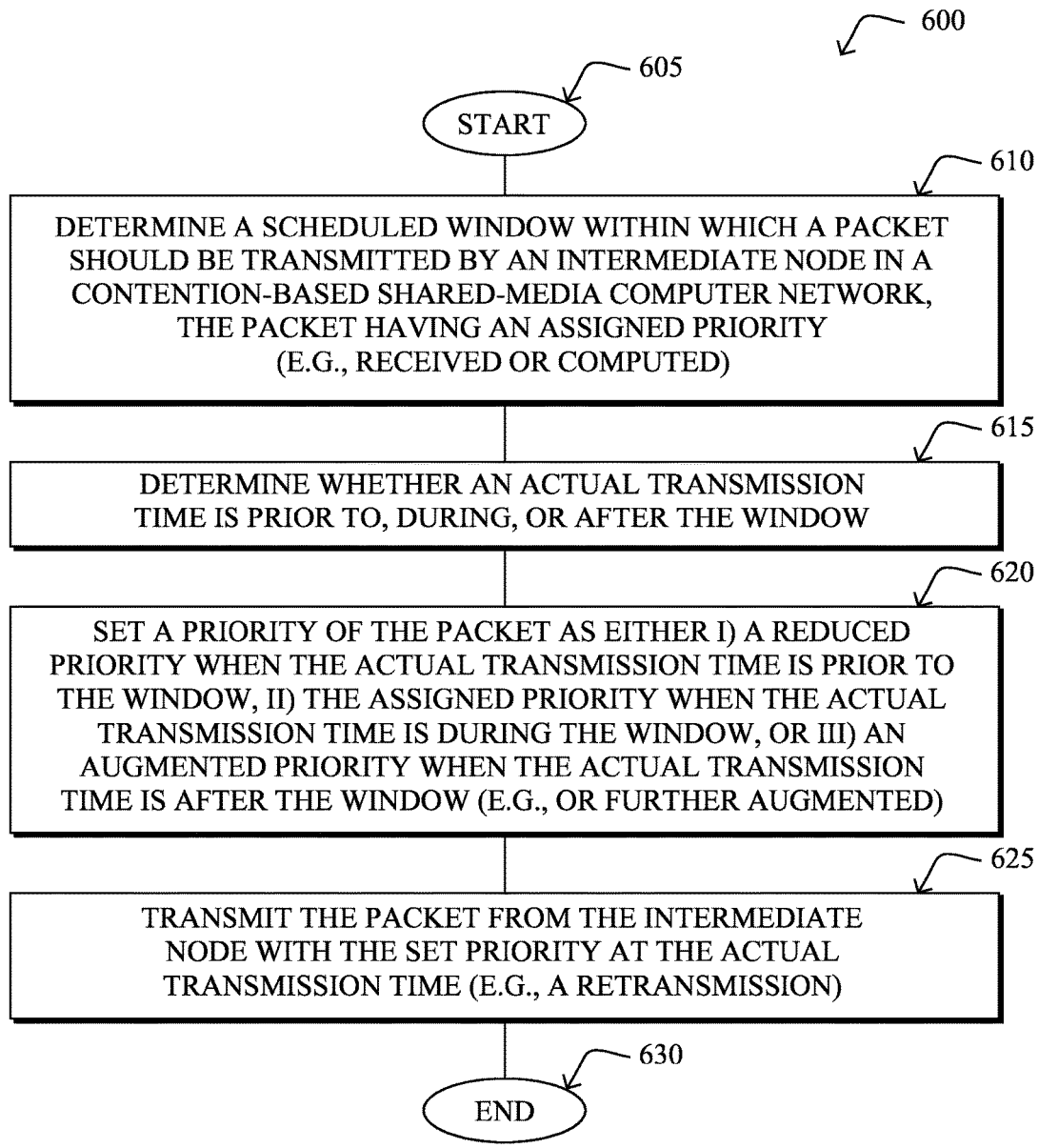
FIG. 6 illustrates an example simplified procedure for schedule-based prioritization in contention-based shared-media computer networks.

FIG. 6 illustrates an example simplified procedure 600 for schedule-based prioritization in contention-based shared-media computer networks in accordance with one or more embodiments described herein. The procedure 600 may start at step 605, and continues to step 610, where, as described in greater detail above, an intermediate node in a contention-based shared-media computer network determines a scheduled window 510 within which a packet 400 (having an assigned priority 412) should be transmitted by the intermediate node. As detailed above, the window may either be received at the intermediate node, such as within the packet (window 414) or from a centralized computing device, or else may be computed by the intermediate node itself. In step 615, the node may then determine whether an actual transmission time is prior to, during, or after the window, such that in step 620 the node may set a priority of the packet as either i) a reduced priority when the actual transmission time is prior to the window, ii) the assigned priority when the actual transmission time is during the window, or iii) an augmented priority when the actual transmission time is after the window (e.g., or further augmented for further delay), as described above. In step 625, the intermediate node may then transmit the packet with the set priority at the actual transmission time, and the simplified procedure 600 ends in step 630. Notably, for retransmissions, the procedure 600 may start again at step 605, where the priority of retransmitted packets may adjust based on the passage of time with relation to the scheduled window 510, accordingly.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for schedule-based prioritization in contention-based shared-media computer networks. In particular, as opposed to a TDM reservation model, the techniques herein benefit from statistical multiplexing sensitive to the deadline of the packets to optimize the use of available bandwidth while avoiding contention close to the root, thus optimizing throughput, latency, and jitter. In other words, the techniques herein efficiently manage the increase in traffic as it reaches closer to the root by dynamically adjusting a packet's priority dependent upon whether it is ahead of or behind schedule.

While there have been shown and described illustrative embodiments that provide for schedule-based prioritization in contention-based shared-media computer networks, it is to be understood that various other adaptations and modifications may be made within the spirit and scope of the embodiments herein. For example, the embodiments have been shown and described herein with relation to wireless networks. However, the embodiments in their broader sense are not as limited, and may, in fact, be used with other types of shared-media networks and/or protocols (e.g., power-line communication or PLC). In addition, while certain protocols are shown, such as RPL or other specific LLN protocols, other suitable protocols may be used, accordingly, and other contention-based shared-media network environments may also utilize the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a scheduled window within which a packet should be transmitted by an intermediate node in a contention-based shared-media computer network, the packet having an assigned priority, wherein the window accounts for an expected number of retransmissions (ETX), a wait time and receipt of an acknowledgment;
    determining whether an actual transmission time is prior to, during, or after the window;
    in response to determining whether an actual transmission time is prior to, during or after the window, dynamically adjusting a priority of the packet in a header of the packet as either i) a reduced priority when the actual transmission time is prior to the window, ii) the assigned priority when the actual transmission time is during the window, or iii) an augmented priority when the actual transmission time is after the window; and
    transmitting the packet from the intermediate node with the set priority at the actual transmission time.

2. The method as in claim 1, wherein transmitting the packet and the actual transmission time are for a retransmission of the packet by the intermediate node.

3. The method as in claim 1, wherein setting comprises:
    setting the priority of the packet as a further augmented priority when the actual transmission time is further after the window.

4. The method as in claim 1, wherein the window represents complete transmission of the packet from a source node to a destination node within the computer network.

5. The method as in claim 1, wherein the window is carried within the packet.

6. The method as in claim 1, wherein the window is computed centrally and distributed to at least the intermediate node.

7. The method as in claim 1, wherein the window is based on an expected window specific to each intermediate node along a path of the packet, each expected window computed centrally and distributed to each intermediate node.

8. The method as in claim 1, wherein the window is specific to the intermediate node, the method further comprising:
    computing the window by the intermediate node.

9. The method as in claim 1, further comprising:
    setting the priority for the packet in response to the packet traveling upward in the shared-media computer network toward a root node of the shared-media computer network.

10. An apparatus, comprising:
    one or more network interfaces to communicate within a contention-based shared-media computer network as an intermediate node;
    a processor coupled to the network interfaces and adapted to execute one or more processes; and
    a memory configured to store a process executable by the processor, the process when executed operable to:
        determine a scheduled window within which a packet should be transmitted by the intermediate node, the packet having an assigned priority, wherein the window accounts for an expected number of retransmissions (ETX), a wait time and receipt of an acknowledgment;
        determine whether an actual transmission time is prior to, during, or after the window;
        in response to determining whether an actual transmission time is prior to, during or after the window, dynamically adjust a priority of the packet in a header of the packet as either i) a reduced priority when the actual transmission time is prior to the window, ii) the assigned priority when the actual transmission time is during the window, or iii) an augmented priority when the actual transmission time is after the window; and
        transmit the packet from the intermediate node with the set priority at the actual transmission time.

11. The apparatus as in claim 10, wherein transmitting the packet and the actual transmission time are for a retransmission of the packet by the intermediate node.

12. The apparatus as in claim 10, wherein the process when executed to set is further operable to:
    set the priority of the packet as a further augmented priority when the actual transmission time is further after the window.

13. The apparatus as in claim 10, wherein the window represents complete transmission of the packet from a source node to a destination node within the computer network.

14. The apparatus as in claim 10, wherein the window is carried within the packet.

15. The apparatus as in claim 10, wherein the window is computed centrally and distributed to at least the intermediate node.

16. The apparatus as in claim 10, wherein the window is based on an expected window specific to each intermediate node along a path of the packet, each expected window computed centrally and distributed to each intermediate node.

17. The apparatus as in claim 10, wherein the window is specific to the intermediate node, the process when executed is further operable to:

compute the window by the intermediate node.

18. The apparatus as in claim 10, wherein the process when executed is further operable to:

set the priority for the packet in response to the packet traveling upward in the shared-media computer network toward a root node of the shared-media computer network.

19. A tangible, non-transitory, computer-readable media having software encoded thereon, the software when executed by a processor operable to:

determine a scheduled window within which a packet should be transmitted by an intermediate node in a contention-based shared-media computer network, the packet having an assigned priority, wherein the window accounts for an expected number of retransmissions (ETX), a wait time and receipt of an acknowledgment;

determine whether an actual transmission time is prior to, during, or after the window;

in response to determining whether an actual transmission time is prior to, during or after the window, dynamically adjust a priority of the packet in a header of the packet as either i) a reduced priority when the actual transmission time is prior to the window, ii) the assigned priority when the actual transmission time is during the window, or iii) an augmented priority when the actual transmission time is after the window; and transmit the packet from the intermediate node with the set priority at the actual transmission time.

* * * * *